(12) United States Patent
Wu et al.

(10) Patent No.: US 8,804,793 B2
(45) Date of Patent: Aug. 12, 2014

(54) METHOD AND APPARATUS FOR FAST LINK RECOVERY

(75) Inventors: Jiangfeng Wu, San Jose, CA (US); Jose Tellado, Mountain View, CA (US); John Dring, San Jose, CA (US); Nima Ferdosi, San Jose, CA (US)

(73) Assignee: Aquantia Corporation, Milpitas, CA (US)

( * ) Notice: Subject to any disclaimer, the term of this patent is extended or adjusted under 35 U.S.C. 154(b) by 413 days.

(21) Appl. No.: 12/857,080

(22) Filed: Aug. 16, 2010

(65) Prior Publication Data
US 2012/0014420 A1   Jan. 19, 2012

Related U.S. Application Data

(60) Provisional application No. 61/364,893, filed on Jul. 16, 2010.

(51) Int. Cl.
*H04B 1/38* (2006.01)
(52) U.S. Cl.
USPC ........................................................ 375/219
(58) Field of Classification Search
USPC ................... 375/219, 222; 370/485; 348/473
See application file for complete search history.

(56) References Cited

U.S. PATENT DOCUMENTS

| | | | |
|---|---|---|---|
| 7,071,994 B2 * | 7/2006 | Harris et al. | 348/473 |
| 2003/0016770 A1 | 1/2003 | Trans et al. | |
| 2003/0086515 A1 | 5/2003 | Trans et al. | |
| 2003/0156603 A1 * | 8/2003 | Rakib et al. | 370/485 |
| 2006/0153283 A1 | 7/2006 | Scharf et al. | |
| 2006/0274824 A1 * | 12/2006 | Kroninger et al. | 375/219 |
| 2010/0054315 A1 * | 3/2010 | Huang et al. | 375/222 |

\* cited by examiner

*Primary Examiner* — Daniel Washburn
*Assistant Examiner* — Fitwi Hailegiorgis
(74) *Attorney, Agent, or Firm* — Lance Kreisman; Peninsula Patent Group (57) ABSTRACT

Embodiments of methods and apparatus for fast link recover are disclosed. One method includes sensing a link quality failure of a link between a receiver and a transmitter. If a link quality failure is sensed, then the receiver selects new pre-coder settings for the transmitter. The receiver communicates the new pre-coder settings to the transmitter. The transmitter applies the new pre-coder settings. The receiver computes its equalizer settings based on the new pre-coder settings of the transmitter. One apparatus or transceiver includes a means for determining a link quality failure of a link between the transceiver and a link partner transceiver. The transceiver selects new pre-coder settings for the link partner transceiver if a link quality failure is sensed. Additionally, the transceiver communicates the new pre-coder settings to the link partner transceiver, and computes its equalizer settings based on the new pre-coder settings of the link partner transceiver.

29 Claims, 8 Drawing Sheets

METHOD AND APPARATUS FOR FAST LINK RECOVERY

RELATED APPLICATIONS

This patent application claims priority to U.S. provisional patent application Ser. No. 61/364,893 filed on Jul. 16, 2010, which is incorporated by reference

FIELD OF THE INVENTION

The invention relates generally to network communications. More particularly, the invention relates to methods and apparatuses for recovering a link upon detection of a link quality failure.

BACKGROUND OF THE INVENTION

High-speed networks are continually evolving. The evolution includes a continuing advancement in the operational speed of the networks. The network implementation of choice that has emerged is Ethernet networks physically connected over twisted pair wiring. Ethernet in its 10/100BASE-T form is one of the most prevalent high speed LANs (local area network) for providing connectivity between personal computers, workstations and servers.

High-speed LAN technologies include 100BASE-T (Fast Ethernet) and 1000BASE-T (Gigabit Ethernet). Fast Ethernet technology has provided a smooth evolution from 10 Megabits per second (Mbps) performance of 10BASE-T to the 100 Mbps performance of 100BASE-T. Gigabit Ethernet provides 1 Gigabit per second (Gbps) bandwidth with essentially the simplicity of Ethernet. There is a desire to increase operating performance of Ethernet to even greater data rates.

Figure 1:
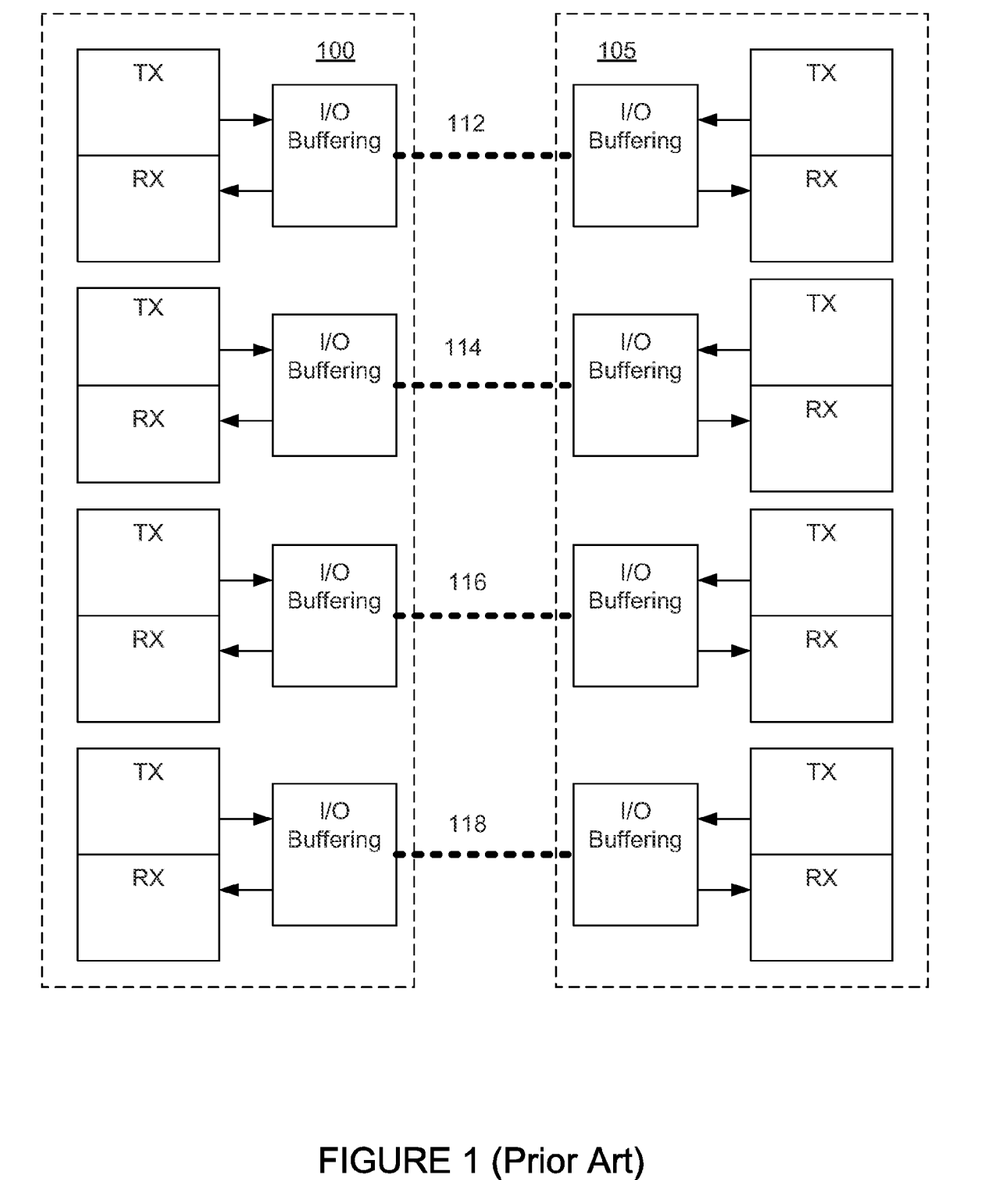
FIG. 1 shows a plurality of prior art Ethernet transceiver pairs.

FIG. 1 shows a block diagram of a pair of Ethernet transceivers communicating over a bi-directional transmission channel, according to the prior art. An exemplary transmission channel includes four pairs of copper wire 112, 114, 116, 118. The transceiver pair can be referred to as link partners, and includes a first Ethernet port 100 and a second Ethernet port 105. Both of the Ethernet ports 100, 105 include four transmitter $T_X$, receiver $R_X$, and I/O buffering sections corresponding to each of the pairs of copper wires 112, 114, 116, 118.

Failure of the link between link partners can occur in many different ways. Generally, a reduction of signal to noise ratio of signals being communicated across the link can lead to failure of the link. This generally occurs due to either a reduction in signal power, or an increase in noise and/or interference. Signal power can be compromised due to excessive attenuation of the signal. Noise and/or interferences can be introduced due to, for example, electromagnetic interference. Other sources of noise and/or interference include jitter, time varying signal components, inter-symbol interference (ISI), residual echo, near end cross-talk (NEXT), far end cross-talk (FEXT).

The twisted copper wires can operate as antennas that are susceptible to receive electromagnetic interference (EMI). Generally, the EMI appears as a narrowband interference source to Ethernet receivers. Typically, Ethernet systems mostly rely on EMI protection that is provided by shielding, and by transmitting the information differentially to provide immunity against the common-mode characteristics of the EMI. Higher frequency EMI can be partially rejected by the filtering performed at the analog-front end (AFE) of the Ethernet receiver. Additionally, in the past, Ethernet systems had sufficient operating margin such that the EMI did not cause the link to fail.

However, the immunity of current Ethernet systems (higher frequency systems) to EMI is not sufficient, and the EMI can cause the link to fail, and be unable to transmit data. Suppression of EMI can be extremely challenging since the EMI usually appears at unknown times and with unknown frequency, bandwidth, power, modulation, duration, etc. Additionally, suppressing the EMI when the link is already transmitting data is extremely difficult since the EMI characteristics need to be determined very fast to be able to cancel the EMI before the link fails. Moreover, there is no training data to help detect and cancel the EMI since the link is transmitting real traffic.

It is desirable to have an apparatus and method for recovering a link between link partners as quickly as possible when a failure of the link has been detected.

SUMMARY OF THE INVENTION

An embodiment includes a method of fast link recovery. The method includes sensing a link quality failure of a link between a receiver and a transmitter. If a link quality failure is sensed, then the receiver selects new pre-coder settings for the transmitter. The receiver communicates the new pre-coder settings to the transmitter. The transmitter applies the new pre-coder settings. The receiver computes its equalizer settings based on the new pre-coder settings of the transmitter.

Another embodiment includes a transceiver. The transceiver includes a means for determining a link quality failure of a link between the transceiver and a link partner transceiver. The transceiver selects new pre-coder settings for the link partner transceiver if a link quality failure is sensed. Additionally, the transceiver communicates the new pre-coder settings to the link partner transceiver, and computes its equalizer settings based on the new pre-coder settings of the link partner transceiver.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

The described embodiments are readily understood by the following detailed description in conjunction with the accompanying drawings, wherein like reference numerals designate like structural elements, and in which.

DETAILED DESCRIPTION

As shown in the drawings for purposes of illustration, the invention is embodied in an apparatus and methods for recovering a link between transceivers when a failure of the link has been sensed.

Figure 2:
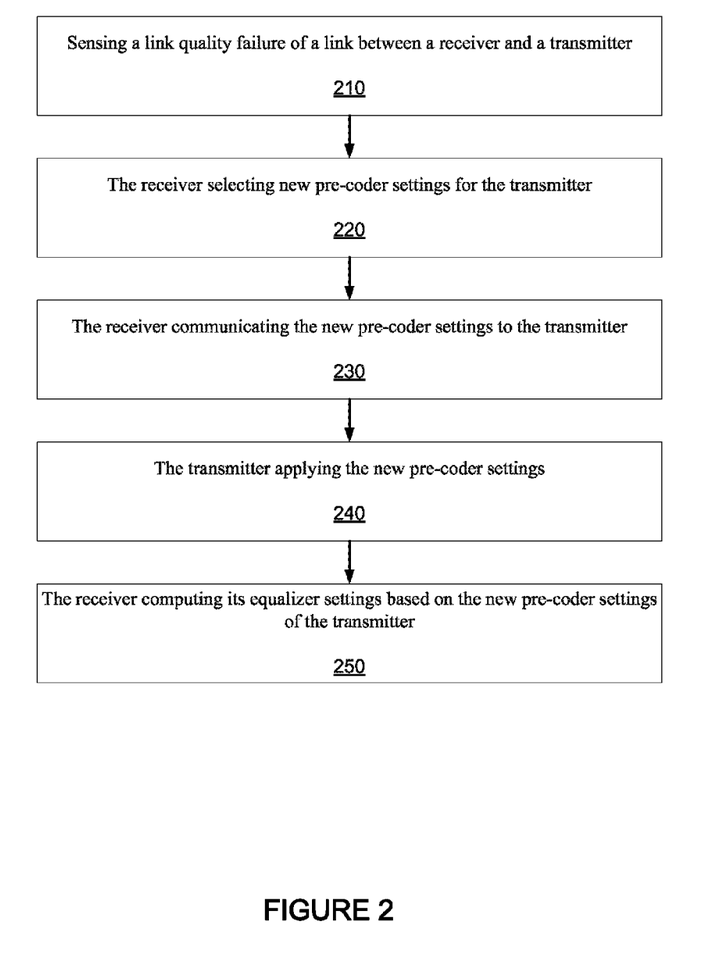
FIG. 2 is a flow chart that includes steps of an example of a method of fast link recovery.

FIG. 2 is a flow chart that includes steps of an example of a method of fast link recovery. A first step 210 includes sensing a link quality failure of a link between a receiver and a transmitter. If a link quality failure is sensed, then the following steps are executed. A second step 220 includes the receiver selecting new pre-coder settings for the transmitter. A third step 230 includes the receiver communicating the new pre-coder settings to the transmitter. A fourth step 240 includes the transmitter applying the new pre-coder settings. A fifth step 250 includes the receiver computing its equalizer settings based on the new pre-coder settings of the transmitter. For embodiments, the receiver is within a first transceiver and the transmitter is within a second transceiver, wherein the first transceiver and the second transceiver are link partners. That is, the first transceiver is at one end of the link and the second transceiver is at the other end of the link. For a specific embodiment, the new pre-coder settings of-the transmitter include Tomlinson-Harashima Pre-coder settings.

The sensing a link quality failure of the link between a receiver and a transmitter generally occurs in one of two ways. A first way includes the receiver detecting or sensing that the received signal has poor quality. Generally (though not always), this includes an SNR (signal to noise ratio) of the received signal being lower than a desired threshold. Generally, the low SNR is a result of a change in the signal level of the receive signal, or a change in noise and/or interference within the receive signal. A second way includes the receiver receiving an indication from the link partner (the transmitter) of a failure at the other end of the link.

The link partner can indicate a link failure at the other end of the link by communicating a link failure through an indicator, or the link partner can change the transmission mode. The transmission mode change can include the link partner transmitting training signals upon sensing a link failure at the link partner's end of the link. The training signals are not data, and therefore, create packet errors (100% errors) at the receiver, which causes the receiver to indicate a link failure. Either way, the link failure is communicated to the receiver from the link partner (transmitter). It should be noted that in the situation where the receiver receives an indication of link failure, the receiver may very well maintain the pre-coder settings because the failure is at the other end of the link. For example, of the link partner is suffering from reception of EMI, but the receiver is not, the receiver may maintain the pre-coder settings. If, for example, the link quality is determined to be above a threshold, then the new pre-coder setting can be set to maintain the same previous pre-coder settings. That is, the pre-coder settings do not change.

For an embodiment, the receiver is a part of a first transceiver, and the first transceiver initiates a training mode if a link quality failure is sensed. The training mode includes the transmission of information signals (not data) and is robust. Therefore, the training mode is a desirable point to determine new pre-coder settings. A more specific embodiment includes the receiver being a part of a first transceiver; the transmitter being a part of a second transceiver, and the first transceiver and the second transceiver are synchronized and initiate the training mode if a link quality failure is sensed.

Generally, synchronization is maintained in two different scenarios. The first scenario includes both transceivers (the first transceiver and the second transceiver) simultaneously (at least near-simultaneously) detecting a link failure, and therefore, going into training modes at least near-synchronously. The second scenario includes a first transceiver detecting a link failure and communicating an indicator of the failure to the second transceiver. If the second transceiver did not detect the link failure, the second transceiver needs to react quickly enough in activating a training mode in response to receiving the indicator that the two transceivers maintain synchronization. The reaction time is either specified or agreed upon during auto negotiation between the first transceiver and the second transceiver. For an embodiment, the reaction time is a predetermined amount of time, and the second transceiver activates the training mode within the predetermined amount of time of receiving the indicator from the first transceiver. If synchronization is not maintained, the fast link recovery will fail.

For an embodiment, the receiver is a part of a first transceiver, the transmitter is a part of a second transceiver, and the first transceiver and the second transceiver exchange information during an auto-negotiation to determine if both transceivers support a fast link recovery mode.

For an embodiment, the receiver selecting new pre-coder settings for the transmitter includes characterizing distortion of signals received through the link between the receiver and the transmitter. The distortion of received signals can include noise, interference, jitter, time varying signal components, inter-symbol interference (ISI), residual echo, near end cross-talk (NEXT), and/or far end cross-talk (FEXT).

For an embodiment, selecting the new pre-coder settings is based at least in part on previous pre-coder settings and the distortion. For an embodiment, this includes characterizing a distortion spectrum of signals received through the link between the receiver and the transmitter. For another embodiment, this includes characterizing an interference spectrum of signals received through the link between the receiver and the transmitter.

For an embodiment, the distortion includes narrowband interference. Various embodiments can be used for identifying the narrowband interference. For an embodiment, the narrowband interference includes interference energy above a first threshold over a frequency bandwidth of less than a second threshold. For a more specific embodiment, the second threshold is a bandwidth of less than $1/10$ a bandwidth of a desired bandwidth of transmission signals.

An embodiment includes identifying frequencies of the narrowband interference. Additionally, the receiver selects the new pre-coder settings for the transmitter by placing pole frequencies of the pre-coder based on (proximate to) the identified frequencies of the narrowband interference.

Figure 5A:
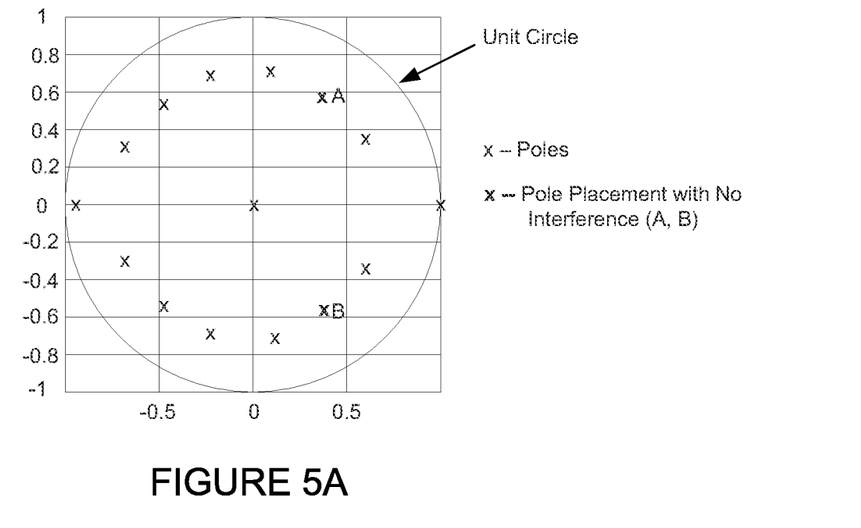
FIGS. 5A, 5B, 5C show examples of pole selections for different levels of interference.
Figure 5B:
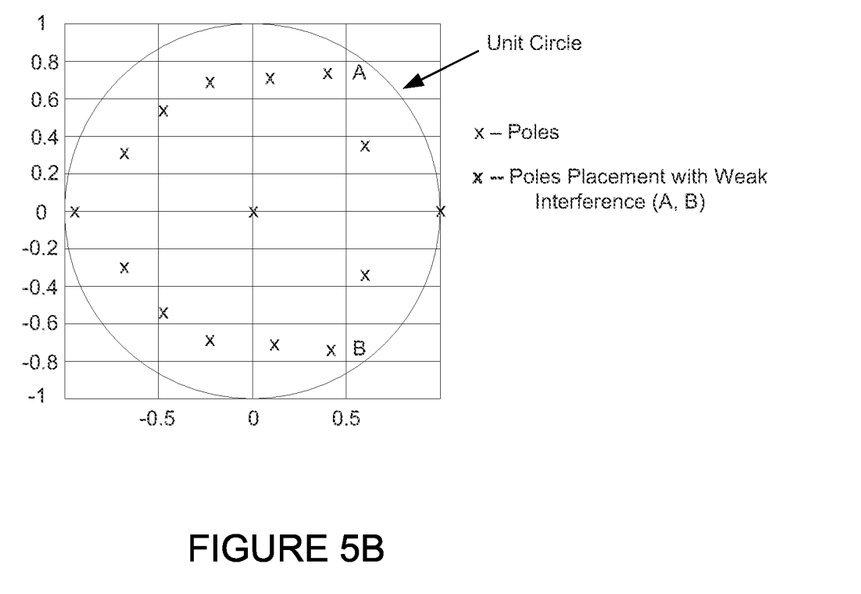
Figure 5C:
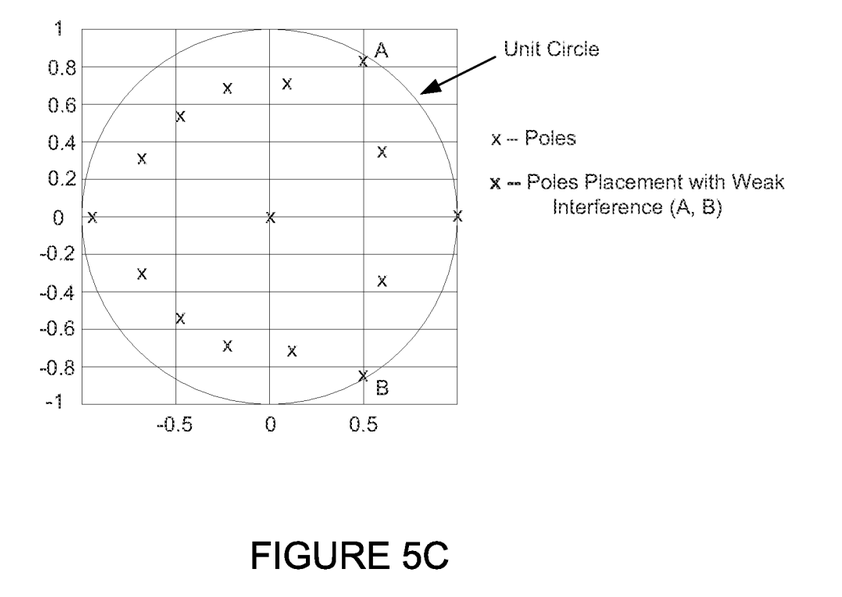

Another embodiment includes characterizing an amplitude of the narrowband interference by looking at the interference strength relative to signal strength or signal to interference ratio. Additionally, the receiver selects new pre-coder settings for the transmitter by selecting pole amplitudes of the pre-coder as a function of the amplitude of the narrowband interference. The bigger the amplitude of the narrowband interference is, the closer the pole is to the unit circle, as illustrated in FIG. 5A, FIG. 5B, and FIG. 5C.

An embodiment includes the receiver selecting new pre-coder settings for the transmitter by characterizing a spectrum of signals received through the link between the receiver and the transmitter. A more specific embodiment includes selecting the new precoder settings based at least in part on previous pre-coder settings and a spectral decomposition of the characterized receive signal and distortion of the received signals.

As described, the receiver computing its equalizer settings based on the new pre-coder settings. For embodiments, this includes the receiver re-computing previously selected equalizer settings. The re-computing can be adaptive or iterative. Embodiments of re-computing further include re-computing coefficients of echo cancelation filters, near end cross talk cancelation filters, and/or far end cross talk cancelation filters.

For an embodiment, re-computing previously selected equalizer settings includes convolving the previously selected equalizer settings by a re-computing filter.

For descriptive purposes, it is assumed that the precoder is an IIR (infinite impulse response) filter, with finite length feedback filter with N+1 coefficients, where N is a non-negative integer. Additionally, the following notation is used: PRECODER_new is a new precoder feedback setting that is to provide a better match to current channel (link), and has a finite length N+1. That is, PRECODER_new=[p(1) p(2) ... p(N)]. PRECODER_old is the feedback filter of previous precoder having a finite length N+1. That is, PRECODER_old=[x(1) x(2) ... x(N)]. EQ_new is a new equalizer setting that matches a precoder with feedback setting PRECODER_new. EQ_old is an old equalizer that matches a precoder with feedback setting PRECODER_old. * denotes convolution, and & denotes de-convolution. PRECODER_diff represents PRECODER_new de-convolved by PRECODER_old. PRECODER_diff=[q(1) q(2), ... q(M)], M is non-negative integer.

For the embodiment, re-computing previously selected equalizer settings includes convolving the previously selected equalizer settings by a recomputation filter. That is, EQ_new=EQ_old*PRECODER_diff.

For an embodiment, the filter PRECODER_diff is determined by de-convolving the new pre-coder feedback settings by previously existing pre-coder feedback settings. That is, PRECODER_diff=[1 PRECODER_new] & [1 PRECODER_old].

For an embodiment, de-convolving the new pre-coder feedback settings by previously existing pre-coder feedback settings includes determining a polynomial representation of the new pre-coder feedback settings, determining a polynomial representation of the previously existing pre-coder feedback settings, and dividing the polynomial representation of the new pre-coder feedback settings by the polynomial representation of the previously existing pre-coder feedback settings. More specifically, PRECODER_new($z$)=$p[1]z^{-1}+p[2]z^{-2}+\ldots+p[N]z^{-N}$ PRECODER_old($z$)=$x[1]x^{-1}+x[2]z^{-2}+\ldots+x[N]z^{-N}$ PRECODER_diff($z$)=$q[0]+q[1]x^{-1}+q[2]z^{-2}+\ldots+q[M]z^{-M}$ PRECODER_diff($z$)=(1+PRECODER_new($z$))/(1+PRECODER_old($z$)), where / represents a polynomial division. The length of M can be selected based on the desired length of PRECODER_diff to convolve with EQ_old.

Figure 3:
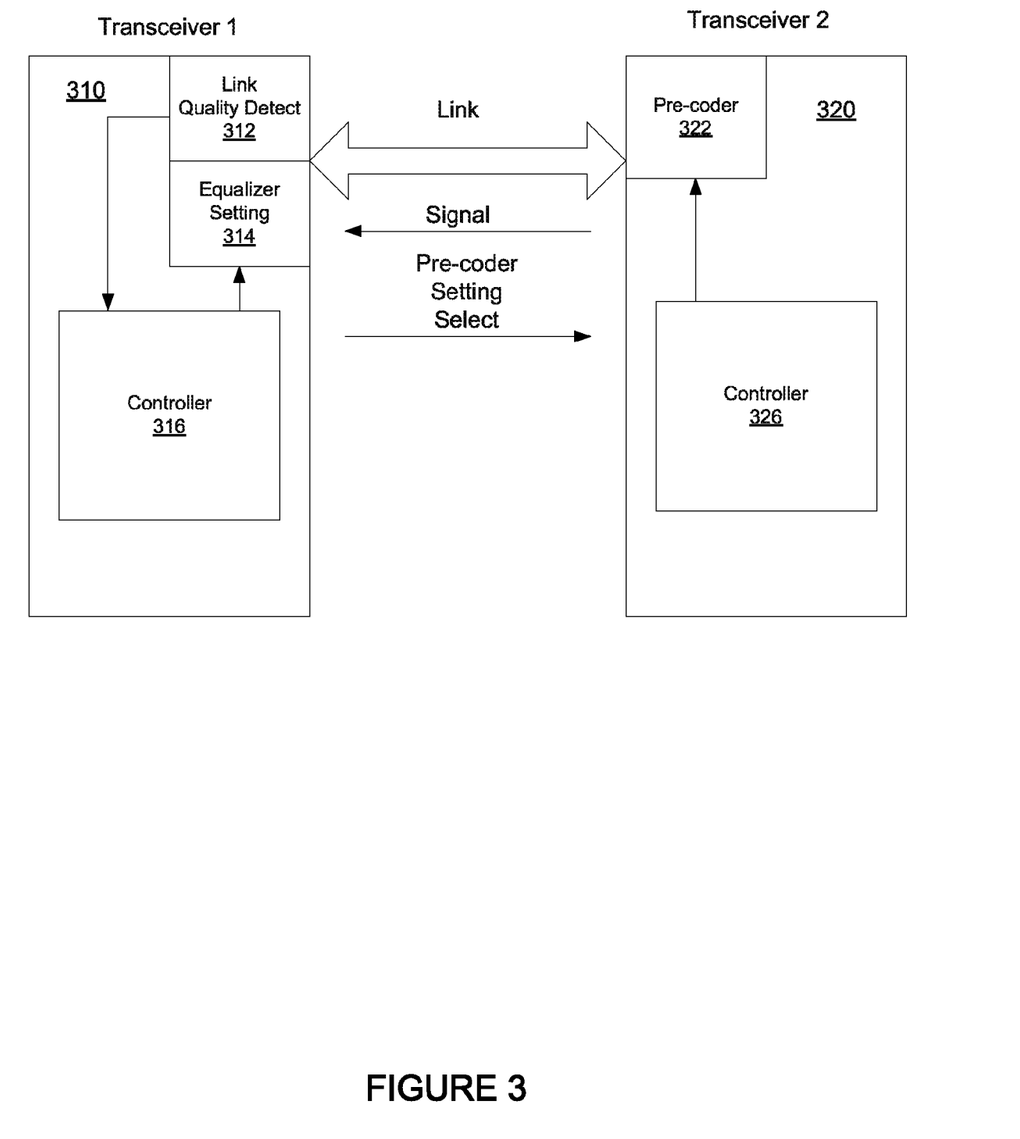
FIG. 3 shows a block diagram of link partners that include embodiments of fast link recovery.

FIG. 3 shows a block diagram of link partners that include embodiments of fast link recovery. More specifically, a first transceiver 310 receives a signal from the second transceiver 320. The first transceiver 310 detects a link quality (link quality detector 312) of the link between the first transceiver 310 and the second transceiver 320 based upon the received signal. If the link quality is detected to be below a threshold, the controller 316 of the first transceiver 310 selects new pre-coder settings for the second transceiver 320. The first transceiver 310 communicates the new pre-coder settings to the second transceiver 320. A controller 326 of the second transceiver 320 then implements the new pre-coder setting within its pre-coder 322. Additionally, the first transceiver selects new equalizer settings within its own equalizer 314 to match the pre-coder settings that were selected. The controllers 316, 326 can include at least one of a processor, hardware logic or software.

While FIG. 3 shows the link detection and pre-coder selection being performed by the first transceiver, it is to be understood that embodiments include both the first transceiver 310 and the second transceiver 320 simultaneously performing link quality detection and pre-coder selection. That is, the operations described as being performed by the first transceiver 310 are simultaneously being performed by the second transceiver 320. It is also to be understood the each transceiver can receive an indicator of the link quality failure from the other transceiver rather than directly sensing the link quality failure.

Figure 4:
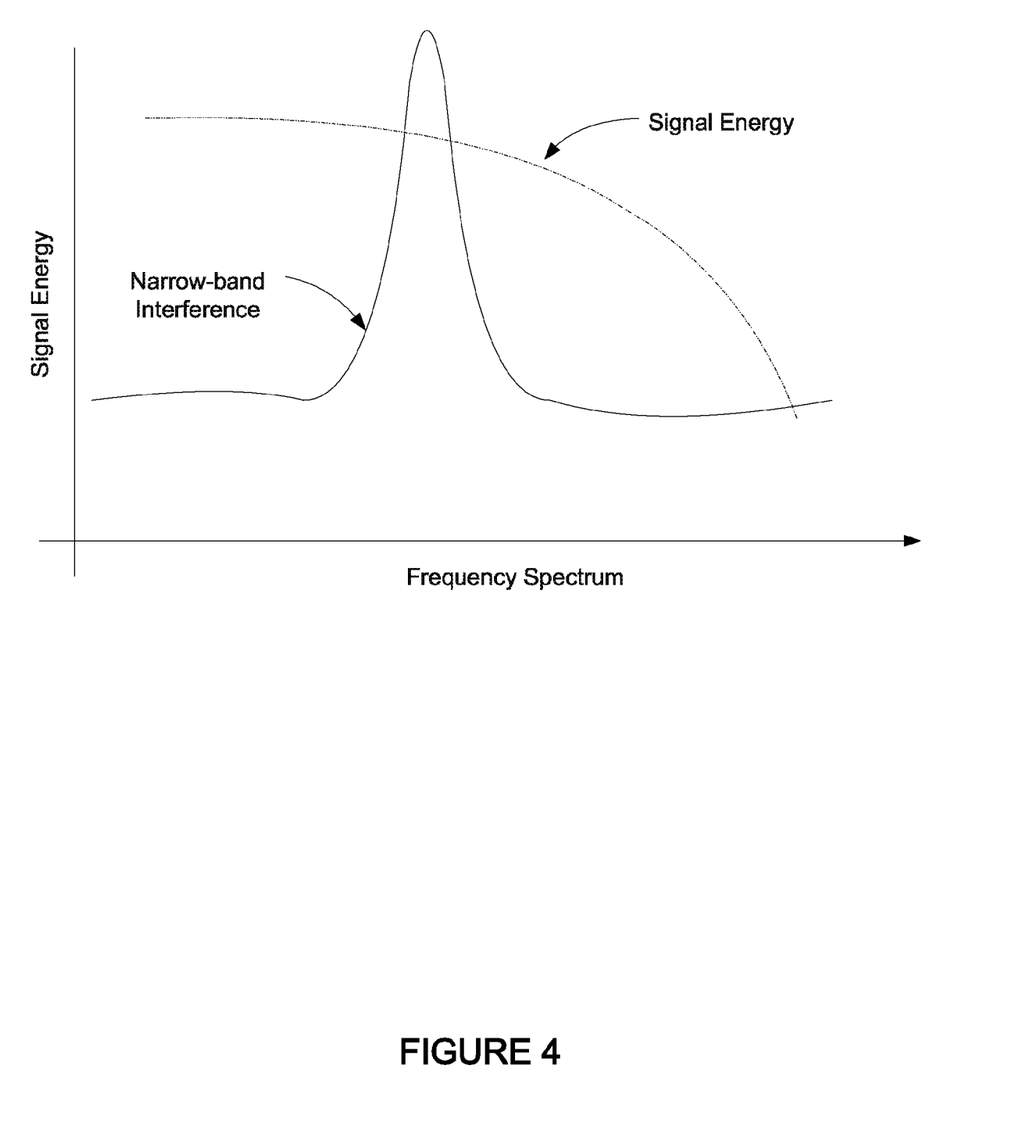
FIG. 4 shows an example of narrow-band interference that can cause failure of a link.

FIG. 4 shows an example of narrow-band interference that can cause failure of a link. As shown, the signal energy to interference energy can greatly vary, particularly if the link is suffering from unintended reception of EMI. The EMI is termed "narrow band" because most of the energy of the interference is focused within a narrow range of frequencies.

As shown, the signal energy follows a first curve. The narrow-band interference which can be caused, for example, by EMI follows another curve. As shown, where the narrow band interference is concentrated, the effective SINR (signal to noise and interference ratio) is small. A failure of the corresponding link will likely occur. Therefore, new pre-coder settings at the transmitter and new equalizer settings at the receiver typically must be made to compensate for the narrow band interference. The new pre-coder settings typically emphasize the signal at frequencies near the detected narrow band interference, and the new equalizer settings that match the pre-coder setting typically de-emphasize signals received at frequencies near the frequencies of the detected narrow band interference. A frequency discriminator can be used to identify the frequencies of the narrow band interference.

FIGS. 5A, 5B, 5C show examples of pole selections for different levels of interference. FIG. 5A shows pole selections for no interference. FIG. 5B shows pole selections for weak interference. As shown, the poles marked A and B are closer to the unit circle. This is because these poles are located proximate in frequency to where the detected interference is located in frequency. The poles marked A and B provide some peaking of the impulse response of the pre-coder at frequencies proximate to the detected interference. FIG. 5C shows pole selections for strong interference. Here, the poles marked A and B are even closer to the unit circle, indicating that even greater peaking of the impulse response of the pre-coder at frequencies proximate to the detected interference.

Figure 6:
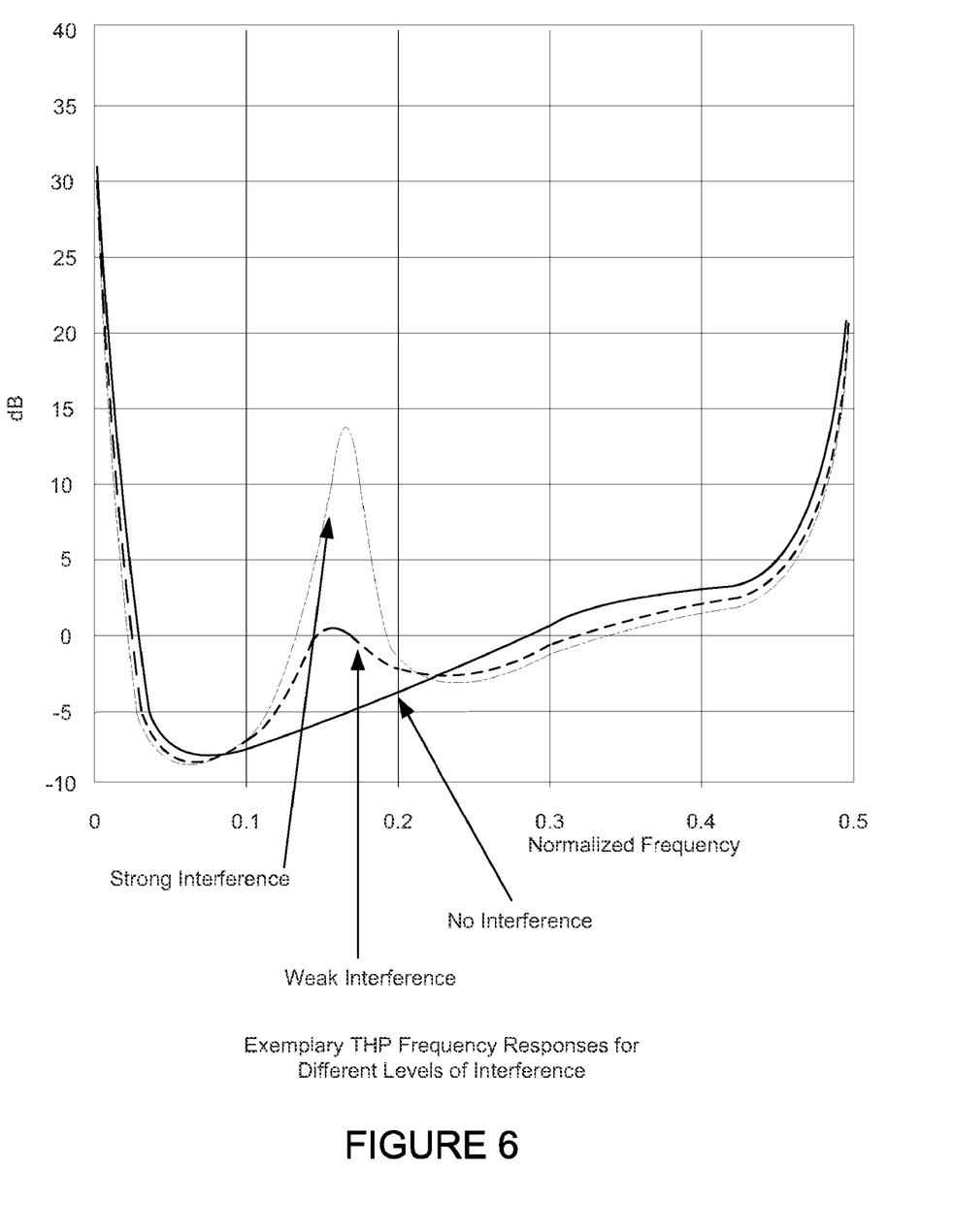
FIG. 6 shows frequency responses correspondihg to the pole selection of FIG. 5A, 5B, 5C.

FIG. 6 shows frequency responses corresponding to the pole selection of FIG. 5A, 5B, 5C. The peaking of the frequency response occurs proximate to the frequency of the detected interference. Additionally, the amplitude of the peaking is proportional to the amplitude of the detected interference. Responses are shown for no interference, weak interference and strong interference. Clearly, the peaking of the frequency response (for example, the previously mentioned THP response) is greatest for the highest interference case.

A Network of Devices

Figure 7:
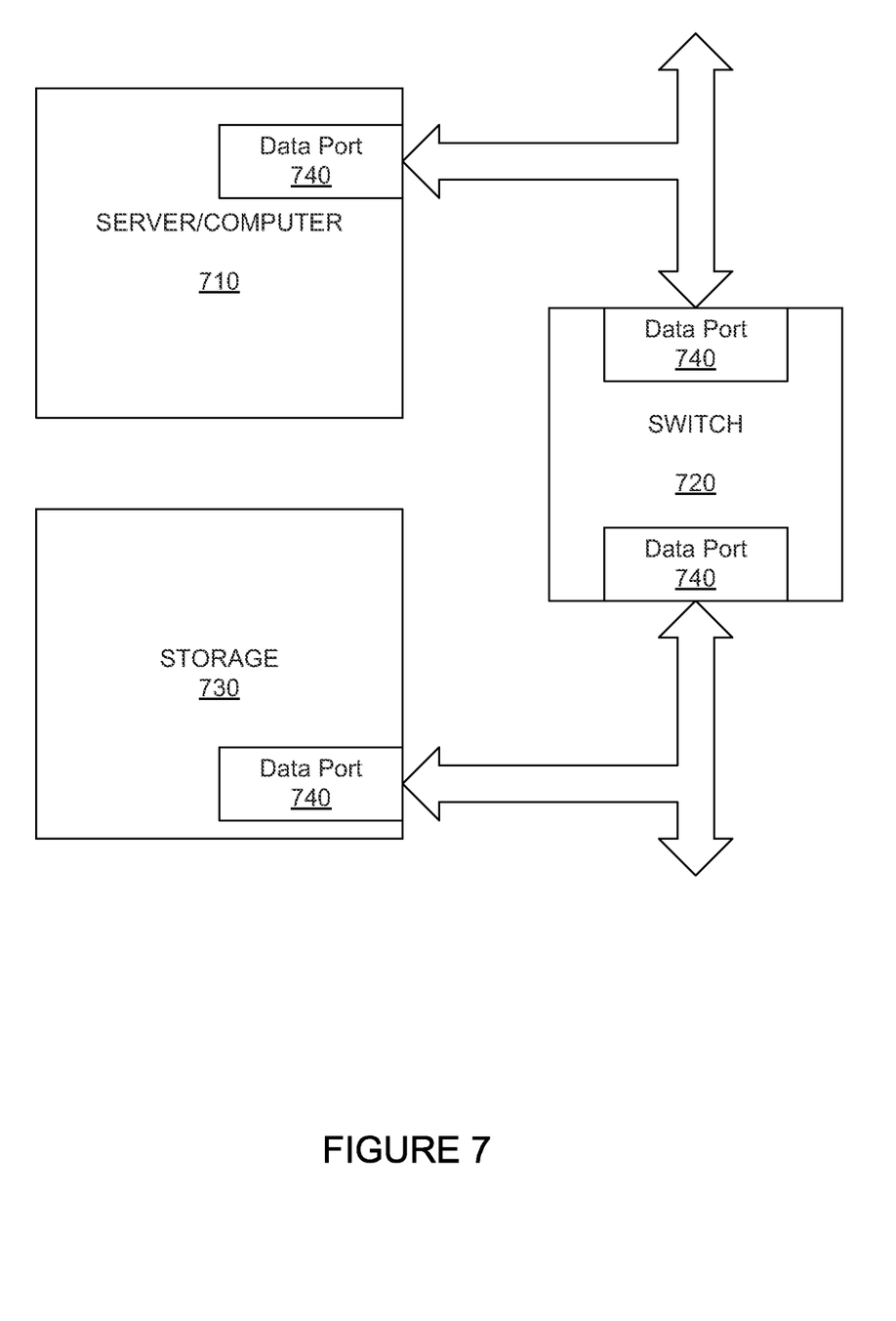
FIG. 7 shows devices connected to an Ethernet network that can include embodiments of fast link recovery.

FIG. 7 shows devices connected to an Ethernet network that can include embodiments of the fast link recovery transceiver. The network includes a server/computer 710, a switch 720 and storage 730 that can all benefit from fast link recovery of a transceiver 740. The server/computer 710 can be connected to the switch 720 through an Ethernet twisted pair LAN connection. The switch 720 can additionally be connected to the storage 730 through an Ethernet twisted pair LAN connection. The transceivers 740 within the server/computer 710, the switch 720, and the storage 730 can provide fast link recovery.

Although specific embodiments of the invention have been described and illustrated, the invention is not to be limited to the specific forms or arrangements of parts so described and illustrated. The invention is limited only by the appended claims.

What is claimed:

1. A method of fast link recovery, comprising:
   sensing a link quality failure of a link between a receiver and a transmitter;
   if a link quality failure is sensed, then:
   the receiver selecting new pre-coder settings for the transmitter including characterizing distortion of signals received through the link between the receiver and transmitter, the new pre-coder settings based on narrowband interference detected from the characterizing, wherein the narrowband interference comprises interference energy above a first threshold over a frequency bandwidth of less than a second threshold;
   the receiver communicating the new pre-coder settings to the transmitter;
   the transmitter applying the new pre-coder settings;
   the receiver computing its equalizer settings based on the new pre-coder settings of the transmitter.

2. The method of claim 1, wherein the receiver is a part of a first transceiver, and the first transceiver initiates a training mode if a link quality failure is sensed.

3. The method of claim 1, wherein the receiver is a part of a first transceiver, the transmitter is a part of a second transceiver, and the first transceiver and the second transceiver are synchronized and initiate a training mode if a link quality failure is sensed.

4. The method of claim 1, wherein sensing a link quality failure comprises at least one of the receiver sensing the link quality, or the receiver receiving a link quality failure indicator from the transmitter.

5. The method of claim 1, wherein the receiver is a part of a first transceiver, the transmitter is a part of a second transceiver, and the first transceiver and the second transceiver exchange information during an auto-negotiation to determine that both transceivers support a fast link recovery mode.

6. The method of claim 1, wherein the new pre-coder settings of the transmitter comprise Tomlinson-Harashima Pre-coder settings.

7. The method of claim 1, wherein distortion of received signals includes at least one of noise, interference, jitter, time varying signal components, inter-symbol interference (ISI), residual echo, near end cross-talk (NEXT), far end cross talk (FEXT).

8. The method of claim 1, further comprising selecting the new pre-coder settings based at least in part on previous pre-coder settings and the distortion.

9. The method of claim 1, wherein the receiver selecting new pre-coder settings for the transmitter comprises characterizing a distortion spectrum of signals received through the link between the receiver and the transmitter.

10. The method of claim 1, wherein the receiver selecting new pre-coder settings for the transmitter comprises characterizing an interference spectrum of signals received through the link between the receiver and the transmitter.

11. The method of claim 1, further comprising identifying frequencies of the narrowband interference, wherein the receiver selecting new pre-coder settings for the transmitter comprises placing pole frequencies of the pre-coder based on the identified frequencies of the narrowband interference.

12. The method of claim 1, further comprising characterizing an amplitude of the narrowband interference, wherein the receiver selecting new pre-coder settings for the transmitter comprises selecting pole amplitudes of the pre-coder as a function of the amplitude of the narrowband interference.

13. The method of claim 1, wherein the receiver selecting new pre-coder settings for the transmitter comprises characterizing a spectrum of signals received through the link between the receiver and the transmitter.

14. The method of claim 13, further comprising selecting the new pre-coder settings based at least in part on previous pre-coder settings and a spectral decomposition of the characterized receive signal and distortion of the received signals.

15. The method of claim 1, wherein if link quality is determined to be above a threshold, then the new pre-coder setting are set to maintain same previous pre-coder settings.

16. The method of claim 1, wherein the receiver computing its equalizer settings based on the new pre-coder settings of the transmitter comprises re-computing previously selected equalizer settings.

17. The method of claim 16, wherein the re-computing is adaptive or iterative.

18. The method of claim 16, wherein re-computing previously selected equalizer settings comprises convolving the previously selected equalizer settings by a filter.

19. The method of claim 18, wherein the filter is determined by de-convolving the new pre-coder settings by previously existing pre-coder settings.

20. The method of claim 19, wherein de-convolving the new pre-coder settings by previously existing pre-coder settings comprising:
    determining a polynomial representation of the new pre-coder settings;
    determining a polynomial representation of the previously existing pre-coder settings;
    dividing the polynomial representation of the new pre-coder settings by the polynomial representation of the previously existing pre-coder settings.

21. A communication system that provides a fast link recovery, comprising:
    means for sensing a link quality failure between a receiver and a transmitter of the communication system;
    if a link quality failure is sensed, then:
    the receiver selecting new equalizer settings for the transmitter including characterizing distortion of signals received through the link between the receiver and the transmitter, and wherein the new equalizer settings are based on narrowband interference detected from the characterizing, wherein the narrowband interference comprises interference energy above a first threshold over a frequency bandwidth of less than a second threshold;
    the receiver communicating the new equalizer settings to the transmitter;
    the transmitter applying the new equalizer settings;
    the receiver comprising an equalizer, wherein the receiver computes equalizer settings based on the new pre-coder settings of the transmitter.

22. The communication system of claim 21, further comprising identifying frequencies and amplitudes of the narrowband interference.

23. The communication system of claim 22, wherein the receiver selecting new pre-coder settings for the transmitter comprises placing pole frequencies of the pre-coder proximate to the identified frequencies of the narrowband interference, and selecting pole amplitudes of the pre-coder as a function of the amplitude of the narrowband interference.

24. The communication system of claim 21, wherein the receiver computing its equalizer settings based on the new pre-coder settings of the transmitter comprises re-computing previously selected equalizer settings.

25. The communication system of claim 24, wherein re-computing previously selected equalizer settings comprises convolving the previously selected equalizer settings by a filter.

26. The communication system of claim 25, wherein the filter is determined by de-convolving the new pre-coder settings by previously existing pre-coder settings.

27. A method of transceiver fast link recovery, comprising:
the transceiver determining a link quality failure of a link between the transceiver and a link partner transceiver;
if a link quality failure is sensed, then:
the transceiver selecting new pre-coder settings for the link partner transceiver including characterizing distortion of signals received through the link between the transceiver and the link partner transceiver, and wherein the new equalizer settings are based on narrowband interference detected from the characterizing, wherein the narrowband interference comprises interference energy above a first threshold over a frequency bandwidth of less than a second threshold;
the transceiver communicating the new pre-coder settings to the link partner transceiver;
the transceiver computing its equalizer settings based on the new pre-coder settings of the link partner transceiver.

28. The method of claim 27, further comprising the transceiver receiving new pre-coder settings from the link partner transceiver and applying the new pre-coder settings to transmit signals.

29. A transceiver comprising:
means for determining a link quality failure of a link between the transceiver and a link partner transceiver;
means for selecting new pre-coder settings for the link partner transceiver if a link quality failure is sensed including means for characterizing distortion of signals received through the link between the transceiver and the link partner transceiver, and wherein the new pre-coder settings are based on narrowband interference detected from the characterizing, wherein the narrowband interference comprises interference energy above a first threshold over a frequency bandwidth of less than a second threshold;
means for communicating the new pre-coder settings to the link partner transceiver;
means for computing the transceiver's equalizer settings based on the new pre-coder settings of the link partner transceiver.

* * * * *